(12) United States Patent
Tohyama

(10) Patent No.: US 8,101,914 B2
(45) Date of Patent: Jan. 24, 2012

(54) THERMAL-TYPE INFRARED SOLID-STATE IMAGING DEVICE AND MANUFACTURING METHOD OF THE SAME

(75) Inventor: Shigeru Tohyama, Tokyo (JP)

(73) Assignee: NEC Corporation, Tokyo (JP)

( * ) Notice: Subject to any disclaimer, the term of this patent is extended or adjusted under 35 U.S.C. 154(b) by 491 days.

(21) Appl. No.: 12/412,708

(22) Filed: Mar. 27, 2009

(65) Prior Publication Data

US 2009/0242768 A1    Oct. 1, 2009

(30) Foreign Application Priority Data

Mar. 28, 2008  (JP) ................ 2008-086526

(51) Int. Cl.
*G01J 5/00* (2006.01)
*G01J 5/20* (2006.01)

(52) U.S. Cl. ............. 250/338.3; 250/38.4; 257/E21.001

(58) Field of Classification Search ............... 250/338.3, 250/338.4, 338.1, 330, 332, 370.08; 257/E21.001
See application file for complete search history.

(56) References Cited

U.S. PATENT DOCUMENTS

| | | | |
|---|---|---|---|
| 7,276,698 B2 | 10/2007 | Tohyama et al. | |
| 2002/0040967 A1 | 4/2002 | Oda | |
| 2004/0089807 A1* | 5/2004 | Wada et al. | 250/338.1 |
| 2010/0006757 A1* | 1/2010 | Oda | 250/330 |

FOREIGN PATENT DOCUMENTS

| | | |
|---|---|---|
| EP | 0859413 A | 8/1998 |
| JP | 2001215151 A | 8/2001 |
| JP | 2004317152 A | 11/2004 |
| JP | 2005116856 A | 4/2005 |
| JP | 2009192350 A | 8/2009 |

OTHER PUBLICATIONS

Japanese Office Action for JP2008-086526 issued Feb. 5, 2010.
European Search Report for EP 09 00 4401 completed May 29, 2009.

* cited by examiner

*Primary Examiner* — David Porta
*Assistant Examiner* — Faye Boosalis

(57) ABSTRACT

A thermal-type infrared solid-state imaging device comprises a infrared detector having at least a substrate provided with an integrated circuit for reading out a signal, a diaphragm for detecting a temperature change by absorbing infrared rays, and a support section for supporting the diaphragm above a surface of one side of the substrate with space in between, and includes an eaves section connected to a connection area provided in the vicinity of outer circumference of the diaphragm and covering at least components other than the diaphragm across a space and transmitting the heat generated by absorbing incident infrared rays to the diaphragm, wherein the eaves section has the thickness of a first region covering the components other than the diaphragm across a space thicker than the thicknesses of a second region contacting the connection area of the diaphragm and a third region rising upward in mid air from the diaphragm.

13 Claims, 6 Drawing Sheets

US 8,101,914 B2

THERMAL-TYPE INFRARED SOLID-STATE IMAGING DEVICE AND MANUFACTURING METHOD OF THE SAME

INCORPORATION BY REFERENCE

This application is based on Japanese Patent Application No. 2008-086526 filed on Mar. 28, 2008 and including specification, claims, drawings and summary. The disclosure of the above Japanese Patent Application is incorporated herein by reference in its entirety.

TECHNICAL FIELD

The present invention relates to a thermal-type infrared solid-state imaging device having a thermal separation structure and a manufacturing method of the same, and in particular, to a thermal-type infrared solid-state imaging device having an eaves structure in which a pixel is improved in fill factor and a manufacturing method of the same.

BACKGROUND ART

To enhance the sensitivity of a thermal-type infrared detector used for a thermal-type infrared solid-state imaging device, the structure and the manufacturing method of a thermal-type infrared solid-state imaging device capable of enhancing a fill factor described in Unexamined Japanese Patent Application KOKAI Publication No. 2001-215151 by an inventor Oda have been proposed. FIG. 4 is a sectional structural drawing along a current path showing a unit pixel of the thermal-type infrared solid-state imaging device described in the Unexamined Japanese Patent Application KOKAI Publication No. 2001-215151.

On a Si integrated circuit substrate I formed with a signal read-out circuit 27, a metal reflection film 2 is formed. For covering the metal reflection film 2, a first insulating protection film 21 is formed. Above a surface on the side of the first insulating protection film 21 of the Si integrated circuit substrate 1, a plurality of infrared receiving sections 22 (diaphragms) are disposed. Each of the infrared receiving sections 22 (diaphragms) is supported above the surface of the first insulating protection film 21 with space in between by a support section 6 across a cavity section 23. One pixel is disposed with one infrared receiving section 22 (diaphragm). The infrared receiving section 22 (diaphragm) is constituted of a bolometer thin film 13 (temperature detecting section), two electrode sections contacting the bolometer thin film 13 (temperature detecting section) of a metal wiring 15, and insulating protection films 24, 25, and 26 surrounding the bolometer thin film 13 (temperature detecting section) and the two electrode sections. The support section 6 includes a beam 6a parallel to a surface of the Si integrated circuit substrate 1 and a support leg 6b connected to one end of the beam 6a, and is structured to surround the metal wiring 15 by the insulating protection films 24, 25, and 26. The beam 6a, though depicted extremely short in FIG. 4, is actually arranged at least along one side of the infrared receiving section 22 (diaphragm) to make thermal conductance small, and its one end is connected to the infrared receiving section 22 (diaphragm). The metal wiring 15, as described above, has its one end electrically connected to the bolometer thin film 13 (temperature detecting section) as an electrode section, and has the other end electrically connected to a connection electrode 3 of the signal read-out circuit 27. An eaves section 12 is protruded from the surface opposite to the Si integrated circuit substrate 1 of the infrared receiving section 22 (diaphragm). The eaves section 12 extends in such a manner as to cover the electrode section, the support section 6, and the connection electrode 3, spaced from the electrode section inside the infrared receiving section 22 (diaphragm), the support section 6, and the connection electrode 3 of the Si integrated circuit substrate 1.

When infrared rays incident on the insulating protection films 24, 25, and 26 of the infrared receiving section 22 (diaphragm) and the eaves section 12, a part of the infrared rays is absorbed by the insulating protection films 24, 25, and 26 and the eaves section 12, respectively, and the insulating protection films 24, 25, and 26 and the eaves section 12 are heated. The infrared rays, which incident on the insulating protection films 24, 25, and 26 and the eaves section 12 but are not absorbed, pass through the infrared receiving section 22 (diaphragm), the eaves section 12, and the support section 6, respectively, and advance toward the Si integrated circuit substrate 1. The infrared rays passing through the infrared receiving section 22 (diaphragm), the eaves section 12, and the support section 6, respectively, are reflected toward the infrared receiving section 22 (diaphragm) and the eaves section 12 by the metal reflection film 2, the metal wiring 15, and the connection electrode 3, and incident on the insulating protection films 24, 25, and 26, and the eaves section 12 again. Thereby, the infrared rays reflected by the metal reflection film 2 and the like are absorbed by the insulating protection films 24, 25, and 26, and the eaves section 12, so that the insulating protection films 24, 25, and 26, and the eaves section 12 are further heated. The heat of the eaves section 12 is transmitted to the bolometer thin film 13 (temperature detecting section) through the insulating protection films 25, and 26. In this manner, the temperature of the bolometer thin film 13 (temperature detecting section) changes by the heat from the eaves section 12 and the insulating protection films 24, 25, and 26, thereby changing a resistance value of the bolometer thin film 13 (temperature detecting section). This change of the resistance value is converted into a voltage change by the signal read-out circuit 27 inside the Si integrated circuit substrate 1, and is read out as an electrical signal. Based on this electrical signal, an infrared image is formed by an external circuit.

In the present pixel structure, the eaves section 12 is protruded from the infrared receiving section 22 (diaphragm), and covers respective surfaces of the electrode section and the support section 6 opposite to the Si integrated circuit substrate 1, and the connection electrode 3 across a space. Hence, the fill factor of each pixel is increased, so that the infrared rays can be absorbed much more and the sensitivity can be enhanced.

In the technique described in the Unexamined Japanese Patent Application KOKAI Publication No. 2001-215151, all of the insulating protection film of the infrared receiving section (diaphragm), the insulating protection film of the support section, and the eaves section are formed of a silicon nitride film, a silicon oxide film or a silicon oxynitride film. Out of these films, the insulating protection film constituting the infrared receiving section (diaphragm) and the insulating protection film constituting the support section are formed by the insulating film of the same layer. However, since the eaves section is structured to extend so as to cover the electrode section, the support section, and the connection electrode, spaced from the electrode section inside the infrared receiving section, the support section, and the connection electrode of the Si integrated circuit substrate, it is formed of the insulating film of a separate layer from the infrared receiving section (diaphragm) and the support section. Hence, the eaves section is directly laminated on the infrared receiving section (diaphragm) in the manufacturing process, and an unnecessary part of the insulating film for eaves formation remains in existence, which does not contribute to the improvement of the fill factor. If this part is left intact, there arises a problem that the heat capacity of the infrared receiving section (diaphragm) meaninglessly increases, thereby causing a problem of reducing a thermal response characteristic.

To prevent the reduction of this thermal response characteristic, the unnecessary part of the insulating film for eaves formation laminated in the vicinity of the center on the infrared receiving section (diaphragm) may be partially removed by etching. Also, in the sectional structural drawing of the thermal-type infrared solid-state imaging device unit pixel shown in FIG. 4, which is described in the Unexamined Japanese Patent Application KOKAI Publication No. 2001-215151, a state in which the unnecessary part of the insulating film for eaves formation laminated on the infrared receiving section (diaphragm) is removed is depicted. According to the description of the Unexamined Japanese Patent Application KOKAI Publication No. 2001-215151, in the process of processing an insulating film for eaves formation into an eaves section form, the unnecessary part of the insulating film for eaves formation directly laminated on this infrared receiving section (diaphragm) is partially removed by etching simultaneously. In this process, since the insulating film for eaves formation has to be surely cut and divided to an eaves section for each pixel, it is necessary to sufficiently add an over-etching which implements etching thicker than the film thickness 5 of the insulating film for eaves formation. Hence, in the manufacturing method of the Unexamined Japanese Patent Application KOKAI Publication No. 2001-215151, the erasing amount of the insulating protection film constituting the infrared receiving section (diaphragm) increases. Further, because of the difficulty to control the erasing amount, there also arises a problem that variance in the characteristics among pixels, wafers, and moreover, lots increases. If the over-etching is performed extremely, there is even a risk that the insulating protection film of the infrared receiving section (diaphragm) is burst through, so that the bolometer thin film (temperature detecting section) is damaged.

To avoid such problem, the inventor of the present application and others have proposed a thermal-type infrared solid-state imaging device and the manufacturing method thereof in Unexamined Japanese Patent Application KOKAI Publication No. 2005-116856 and U.S. Pat. No. 7,276,698 B2, which are high in processing accuracy and partially remove the unnecessary part of the insulating film for eaves formation laminated on the infrared receiving section (diaphragm) while suppressing variance in the characteristics among pixels, wafers, and moreover, lots, thereby enabling the reduction of the thermal response characteristic to be suppressed. FIGS. 5 and 6 are a schematic longitudinal sectional structural drawing and a unit pixel top view showing the unit pixel of the thermal-type infrared solid-state imaging device described in U.S. Pat. No. 7,276,698 B2.

As shown in FIGS. 5 and 6, the eaves section 12 is connected to a diaphragm 5 by a ring-shaped eaves connector 18, and slightly insider thereof, an eaves opening 19 is opened. As shown in the sectional view of FIG. 5, the eaves section 12 is supported above the diaphragm 5 with space in between across from the eaves connector 18 to the eaves opening 19. The unnecessary part of the insulating film for eaves formation having been in the eaves opening 19 is removed with a sacrifice layer serving as an etching stopper provided in the center of the diaphragm 5 in an island-shape, and therefore the eaves section 12 is made to have such a cross-sectional shape. This sacrifice layer is formed simultaneously with a sacrifice layer for securing a space with the eaves section 12, the support section 6, and the like, that is, the same layer. The debris of the sacrifice layer which has become the etching stopper is removed simultaneously with the other sacrifice layers in the subsequent sacrifice layer etching process.

According to this method, the insulating film unnecessary part for eaves formation can be removed by using the etching stopper without making the manufacturing process complicated. Therefore, the problem that variance in characteristics among pixels, wafers, and moreover, lots becomes large is solved without the insulating protection film constituting the infrared receiving section (diaphragm) cut-out.

SUMMARY

In the thermal-type infrared solid-state imaging device according to the Unexamined Japanese Patent Application KOKAI Publication Nos. 2001-215151 and 2005-116856, and U.S. Pat. No. 7,276,698 B2, the eaves section is constituted as a single object, respectively. Hence, when the film thickness of the eaves section is made thin in the attempt at improving the thermal response characteristic of the pixel, there is a problem that the incident infrared ray absorbing ability of the eaves section is reduced.

Further, the eaves connector of the pixel in the thermal-type infrared solid-state imaging device according to Unexamined Japanese Patent Application KOKAI Publication No. 2005-116856 and U.S. Pat. No. 7,276,698 B2 has the geometry defined by a connection area opening of the sacrifice layer by photolithography technique. As the sacrifice layer, photosensitive polyimide, poly silicon, aluminum, and the like are used. In the case of the photosensitive polyimide, a pattern formation is made by direct exposure. In poly silicon and aluminum, first, a photo-resist coated on them is exposed to form a pattern, and subsequently a pattern is formed onto poly silicon and aluminum by etching. When a narrow gap in the vicinity of an apparatus limit is pattern-formed on the photosensitive polyimide and the photo-resist by an exposing apparatus, the gap is expanded due to diffraction effect, and it is extremely difficult to form the pattern in accordance with the exposure mask size. Since such an expansion has to be taken into consideration, there was a problem that a margin from the diaphragm edge to the eaves connector and a margin from the eaves connector to the eaves opening have to be set large. Since the area from the diaphragm edge to the eaves connector, the area of eaves connector and the area from the eaves connector to the eaves opening are the place overlapped with the diaphragm, even if there is the eaves section in these areas or not, equivalent amount of the infrared ray is absorbed. Consequently, the enlarged parts of these areas wastefully reduce the thermal response characteristic.

The present invention has been made in view of the above described problems, and a exemplary object of the invention is to provide an thermal-type infrared solid-state imaging device with a thermal-type infrared detector having the above described eaves structure as a unit pixel and a manufacturing method thereof, and an thermal-type infrared solid-state imaging device capable of improving the thermal response characteristic of an pixel without reducing an incident infrared ray absorbing ability, but rather capable of enhancing the ability, of the eaves section and a manufacturing method thereof.

To achieve the above described object, the thermal-type infrared solid-state imaging device according to a first exemplary aspect of the present invention includes a substrate in which an integrated circuit for reading out a signal is formed; an infrared detector having at least a diaphragm including a temperature detecting section and a support section supporting the diaphragm above a surface of one side of the substrate with space in between and including a wiring electrically connecting the integrated circuit and the temperature detecting section of the diaphragm; an eaves section connected to the vicinity of outer circumference of the diaphragm and having at least a first region extending to the outside of the diaphragm, a second region connected to the vicinity of outer circumference of the diaphragm, and a third region rising upward in mid air from the vicinity of outer circumference, and transmitting the heat generated by absorbing incident infrared rays to the diaphragm, wherein the eaves section has the thickness of the first region thicker than the thickness of the second region and third region.

The manufacturing method of the thermal-type infrared solid-state imaging device according to a second exemplary aspect of the present invention includes at least a first process of disposing a first sacrifice layer on a substrate formed with an integrated circuit for reading out a signal and provided with a connection electrode with the integrated circuit except on the connection electrode; a second process of forming a diaphragm including a temperature detecting section on the first sacrifice layer, and a support section including a wiring electrically connecting the connection electrode of the substrate and the temperature detecting section of the diaphragm, wherein the diaphragm is supported above a surface of one side of the substrate with space in between by the support section; a third process of disposing a second sacrifice layer on entire surface of the substrate, and in addition, disposing a first member for eaves formation on the second sacrifice layer; a fourth process of removing by patterning the first member for eaves formation and the second sacrifice layer on the diaphragm; a fifth process of disposing a third sacrifice layer on the diaphragm except the vicinity of outer circumference; a sixth process of disposing a second member for eaves formation oil entire surface of the substrate; a seventh process of removing by patterning a second member for eaves formation disposed at the inner side than the vicinity of outer circumference of the diaphragm; and an eighth process of removing the first sacrifice layer, the second sacrifice layer, and the third sacrifice layer.

BRIEF DESCRIPTION OF THE DRAWINGS

These objects and other objects and advantages of the present invention will become more apparent upon reading of the following detailed description and the accompanying drawings in which.

EXEMPLARY EMBODIMENT

Figure 1A:
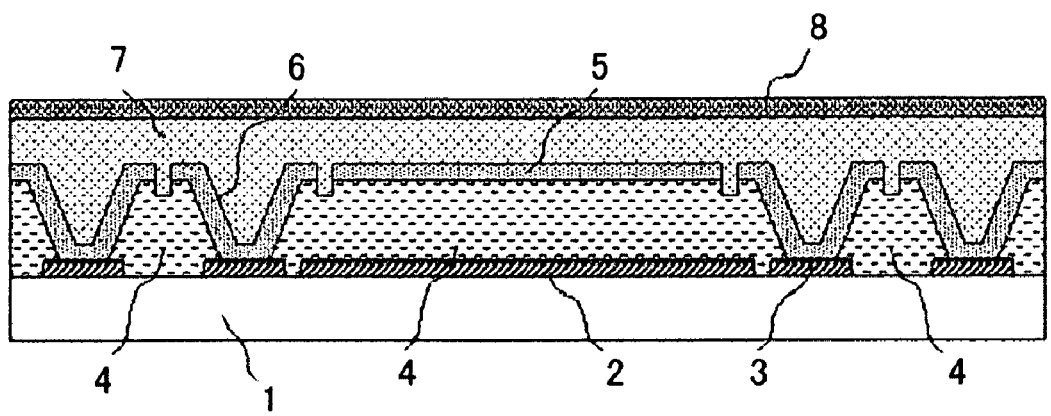
FIG. 1A is a schematic longitudinal sectional structural drawing for describing a structure and a manufacturing method of a thermal-type infrared solid-state imaging device according to one embodiment of the present invention.

A thermal-type infrared solid-state imaging device and a manufacturing method thereof according to one embodiment of the present invention will be described in detail by using the drawings. The same reference numbers will be given to the same or equivalent parts in the drawings.

FIGS. 1A to 1F are longitudinal sectional structural drawings showing the main processes in the manufacturing method of the thermal-type infrared solid-state imaging device according to the present invention. FIGS. 2A and 2B are unit pixel top plan views of a state in which eaves are removed and a state in which eaves are provided, respectively.

First, a Si integrated circuit substrate 1 provided with a plurality of signal reading-out circuits (not shown), metal reflection films 2, and connection electrodes 3 is formed by an ordinary Si integrated circuit manufacturing process. Although not depicted in FIGS. 1A to 1F, an insulating protection film may be formed entirely so as to cover a surface of the Si integrated circuit substrate 1, the metal reflection film 2, and the connection electrode 3.

Figure 2A:
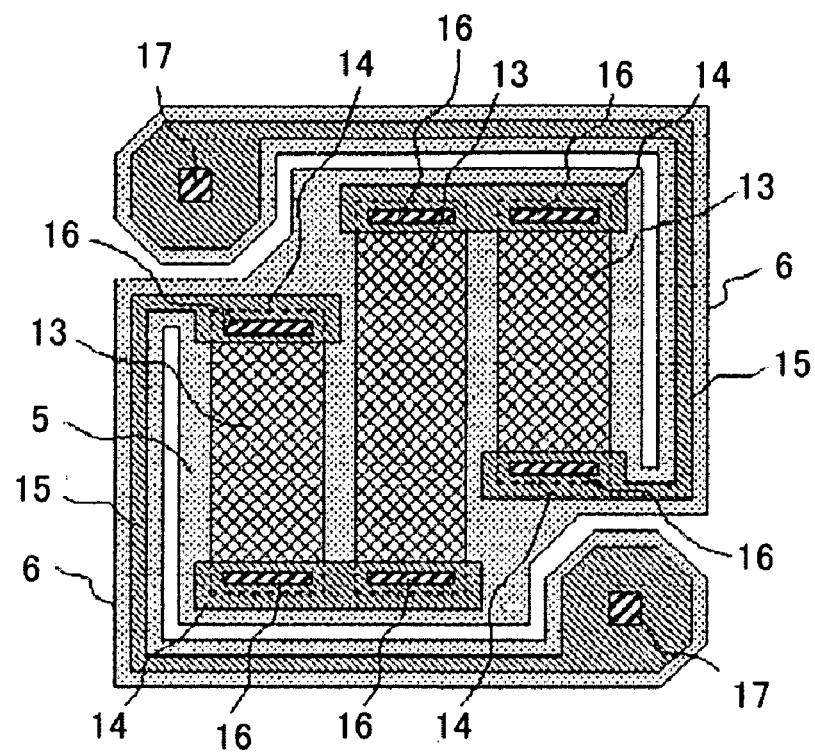
FIG. 2A is a unit pixel top plan view of the thermal-type infrared solid-state imaging device before the formation of an eaves section according to one embodiment of the present invention.
Figure 2B:
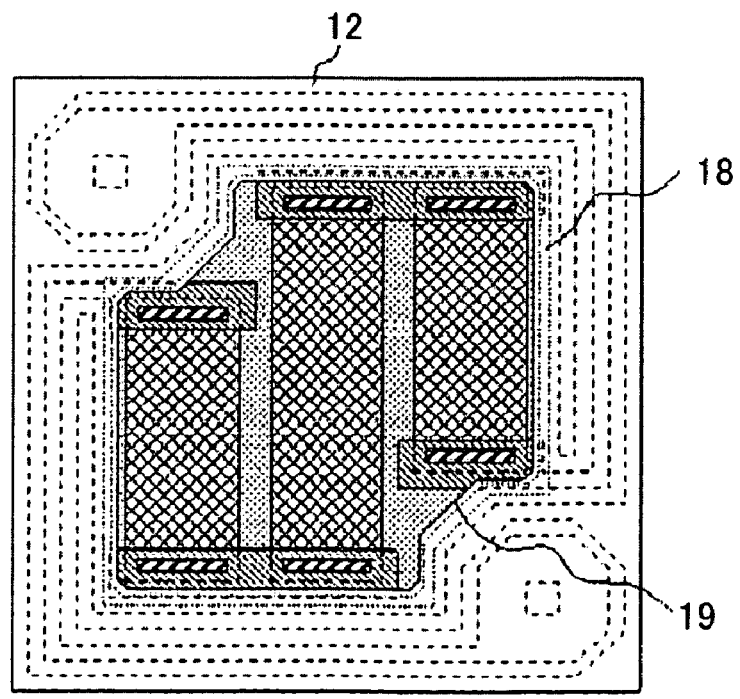
FIG. 2B is a unit pixel top plan view of the thermal-type infrared solid-state imaging device after the formation of an eaves section according to one embodiment of the present invention.

In FIG. 1A, except a contact part with a support section 6 and the connection electrode 3, a first sacrifice layer 4 for forming a gap between a diaphragm 5 and a support section 6 and the Si integrated circuit substrate 1 is formed on the Si integrated circuit substrate 1. The first sacrifice layer 4 is formed by, for example, coating with photosensitive polyimide, patterning by exposure and development, and then, thermal-treating. A thickness of the first sacrifice layer 4 is approximately 0.5 to 3 μm. On the first sacrifice layer 4 and the connection electrode 3, the diaphragm 5 and the support section 6 are formed. The formation of these components is implemented as follows. First, a lower layer insulating protection film is formed by a plasma CVD method and the like. The lower layer insulating protection film is composed of a Si oxide film (SiO, $SiO_2$), a Si nitride film (SiN, $Si_3N_4$) or a Si oxynitride film (SiON) and the like having a thickness of approximately 50 to 500 nm. On this layer, a material film constituting a bolometer thin film 13 is formed by a sputtering method and the like, and the bolometer thin film 13 is patterned so as to correspond to the diaphragm 5 of the pixel shown in FIG. 2A. For example, the bolometer thin film 13 is composed of vanadium oxide ($V_2O_3$, $VO_x$ and the like), titanium oxide ($TiO_x$), and the like having a thickness of approximately 50 to 200 nm. The insulating protection film covering the bolometer thin film 13 is formed by the plasma CVD method and the like, and on this insulating protection film, a bolometer contact 16 and a connection electrode contact 17 are opened. The insulating protection film is composed of a Si oxide film (SiO, $SiO_2$), a Si nitride film (SiN, $Si_3N_4$) or a Si oxynitride film (SiON) and the like having a thickness of approximately 50 to 200 nm. A metal thin film constituting a metal wiring 15 is formed by the sputtering method and the like, and the metal wiring 15 is patterned so as to correspond to the support section 6. The metal wiring 15 is composed of aluminum, copper, gold, titanium, tungsten, molybdenum or titanium/aluminum/vanadium, and the like having the thickness of approximately 50 to 200 nm. Further, an upper layer insulating protection film is formed by the plasma CVD method and the like so as to cover on these elements. The upper layer insulating film is composed of a Si oxide film (SiO, $SiO_2$), a Si nitride film (SiN, $Si_3N_4$) or a Si oxynitride film (SiON) and the like having a thickness of approximately 50 to 500 nm. Finally, the upper layer insulating protection film to the lower layer insulating protection film are gathered together to be patterned to the shape of the diaphragm 5 and the support section 6, thereby reaching the structure of FIG. 2A for completion. The patterning of the diaphragm 5 and the support section 6 has simultaneously an effect of partially exposing polyimide of the first sacrifice layer 4. In FIG. 1A, a second sacrifice layer 7 and a first layer member 8 for eaves formation are further formed on the entire surface on the unit pixel of FIG. 2A. The second sacrifice layer 7 is formed by, for example, coating with photosensitive polyimide, removing it on the periphery of the area in which pixels are arranged in the shape of an array by exposure and development, and then, thermal-treating. The thickness of the second sacrifice layer 7 is approximately 0.5 to 3 μm. The first layer member 8 for eaves formation is composed of a Si oxide film (SiO, $SiO_2$), a Si nitride film (SiN, $Si_3N_4$) or a Si oxynitride film (SiON) and the like having a thickness of approximately 20 to 2000 nm, and is formed by the plasma CVD method and the like.

Figure 1B:
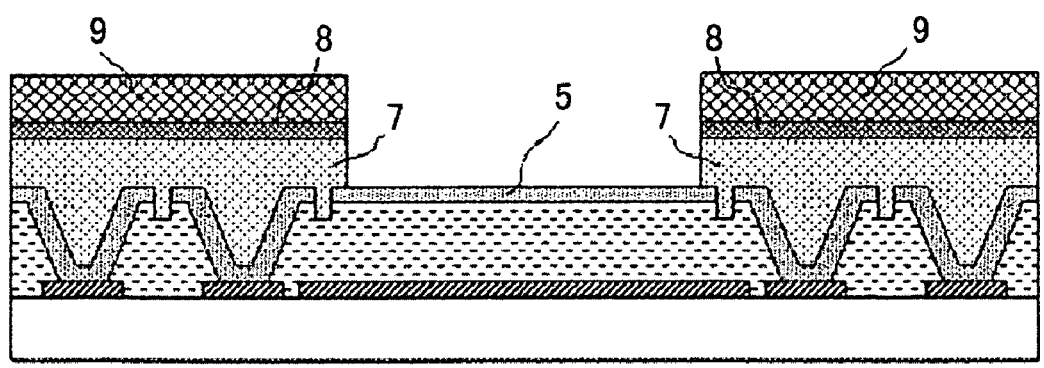
FIG. 1B is a schematic longitudinal sectional structural drawing for describing a structure and a manufacturing method of a thermal-type infrared solid-state imaging device according to one embodiment of the present invention.

In FIG. 1B, by using a photo resist mask 9, the first layer member 8 for eaves formation and the second sacrifice layer 7 are removed by dry etching up to a close vicinity of the edge of the diaphragm 5. Since the area to be removed by etching is not an extremely narrow gap, but is far wider from the standpoint of the exposing apparatus performance, highly accurate patterning can be executed. When the same material is selected as materials of the uppermost layer of the diaphragm 5 and the first layer member 8 for eaves formation, the etching condition should be set so as to have such a high selectivity ratio that the materials are substantially not etched with the second sacrifice layer 7 only being etched before the dry etching removal reaches the diaphragm 5.

Figure 1C:
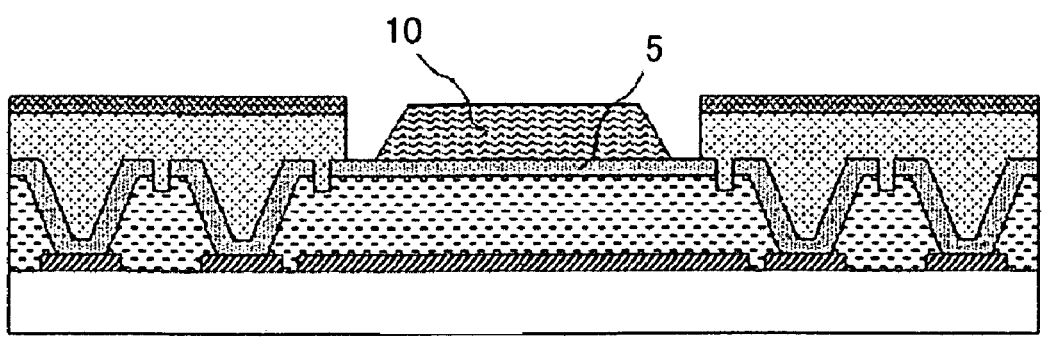
FIG. 1C is a schematic longitudinal sectional structural drawing for describing a structure and a manufacturing method of a thermal-type infrared solid-state imaging device according to one embodiment of the present invention.

In FIG. 1C, a third sacrifice layer 10 is formed at an inner side than the connection area on the diaphragm 5. The third sacrifice layer 10 is formed by, for example, coating with photosensitive polyimide, patterning by exposure and development, and then, thermal-treating. Since the patterning here also removes a far wider area from the standpoint of the exposing apparatus performance, the process can be executed with high accuracy. The width of the connection area on the diaphragm 5 formed as a result can be made into slimness which transcends the limit of the exposing apparatus performance. At the time of coating with photosensitive polyimide in the present process, though there is an area contacting the second sacrifice layer 7 composed of photosensitive polyimide, since the second sacrifice layer 7 is already altered and hardened by the previous thermal treatment, the patterning can be executed without deforming the shape of the second sacrifice layer 7 at the time of exposing and developing. The thickness of the third sacrifice layer 10 is approximately 0.5 to 3 μm.

Figure 1D:
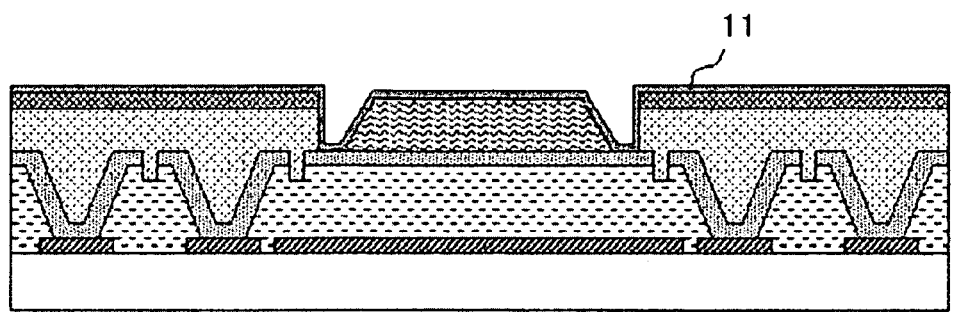
FIG. 1D is a schematic longitudinal sectional structural drawing for describing a structure and a manufacturing method of a thermal-type infrared solid-state imaging device according to one embodiment of the present invention.

In FIG. 1D, a second layer member 11 for eaves formation is formed on the first layer member 8 for eaves formation, the connection area of the diaphragm 5, and the third sacrifice layer 10. The second layer member 11 for eaves formation is composed of a Si oxide film (SiO, $SiO_2$), a Si nitride film (SiN, $Si_3N_4$) or a Si oxynitride film (SiON) and the like having a thickness of approximately 10 to 500 nm, and is formed by the plasma CVD method and the like.

Figure 1E:
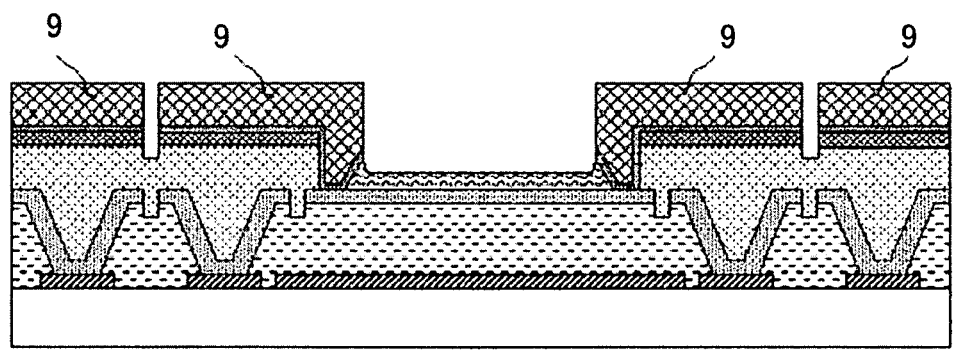
FIG. 1E is a schematic longitudinal sectional structural drawing for describing a structure and a manufacturing method of a thermal-type infrared solid-state imaging device according to one embodiment of the present invention.

In FIG. 1E, though the patterning of the structure of the eaves section 12 for disconnecting the pixel from the pixel is performed, at this time, the unnecessary part of the second layer member 11 for eaves formation on the third sacrifice layer 10 in the center of the diaphragm 5 is also removed by etching. As a result, as shown in FIG. 2B, the eaves section 12 is brought into contact with the diaphragm 5 by an extremely narrow band-shaped eaves connector 18, and slightly inside thereof, the eaves opening 19 is opened. The etching of the unnecessary part of the second layer member 11 for eaves formation is completed inside the island-shaped third sacrifice layer 10, and the inside of the eaves opening 19 is in a state in which a part of the third sacrifice layer 10 is left behind.

Figure 1F:
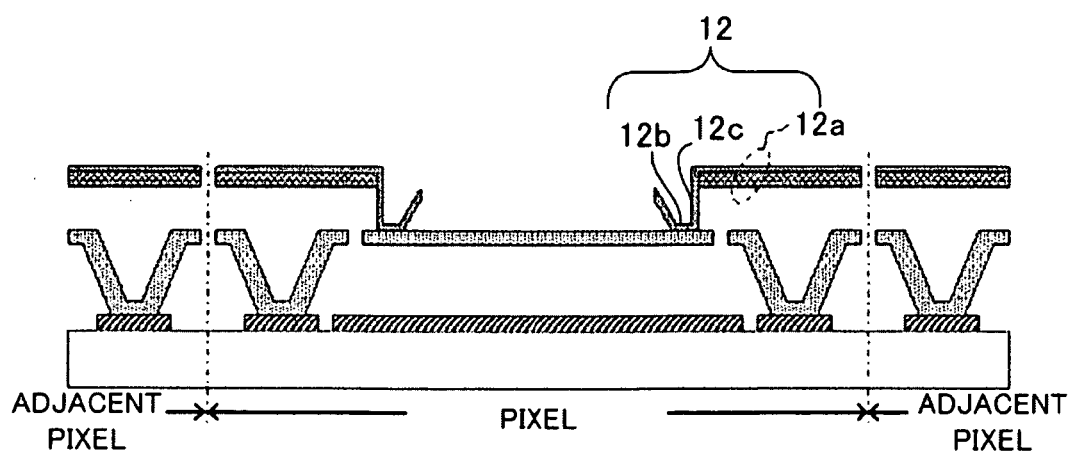
FIG. 1F is a schematic longitudinal sectional structural drawing for describing a structure and a manufacturing method of a thermal-type infrared solid-state imaging device according to one embodiment of the present invention.

In FIG. 1F, the first sacrifice layer 4, the second sacrifice layer 7, and the third sacrifice layer 10 are removed by ashing with $O_2$ gas plasma, thereby forming a gap between the Si integrated circuit substrate 1 and the eaves section 12, and a gap between Si integrated circuit substrate 1 and the diaphragm 5, and at the same time, the inside of the eaves opening 19 is also made empty.

As a result of the above described processes, as shown in FIG. 1F, the structure of the eaves section 12 is made such that a first region 12a covering the surface opposite to the substrate of the components other than the diaphragm 5 disposed across a space with the components other than the diaphragm 5 is made thick in two layers, and a second region 12b contacting the connection area of the diaphragm 5 and a third region 12c rising upward in mid air from the diaphragm 5 are made thin in one layer. Moreover, the thermal-type infrared solid-state imaging device can be realized, wherein a plurality of thermal-type infrared detectors are disposed in which a margin from the diaphragm edge to the eaves connector and a margin from the eaves connector to the eaves opening are extremely small. The thermal-type infrared solid-state imaging device has achieved the purpose of improving the thermal response characteristic of the pixel, while maintaining and enhancing the incident infrared ray absorbing ability.

Figure 5:
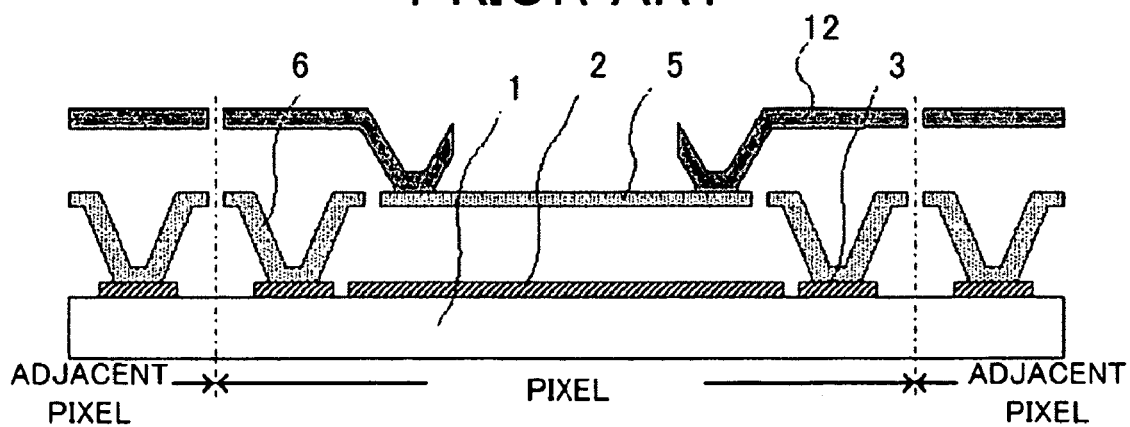
FIG. 5 is a schematic sectional structural drawing showing the unit pixel of the thermal-type infrared solid-state imaging device described in U.S. Pat. No. 7,276,698 B2.
Figure 6:
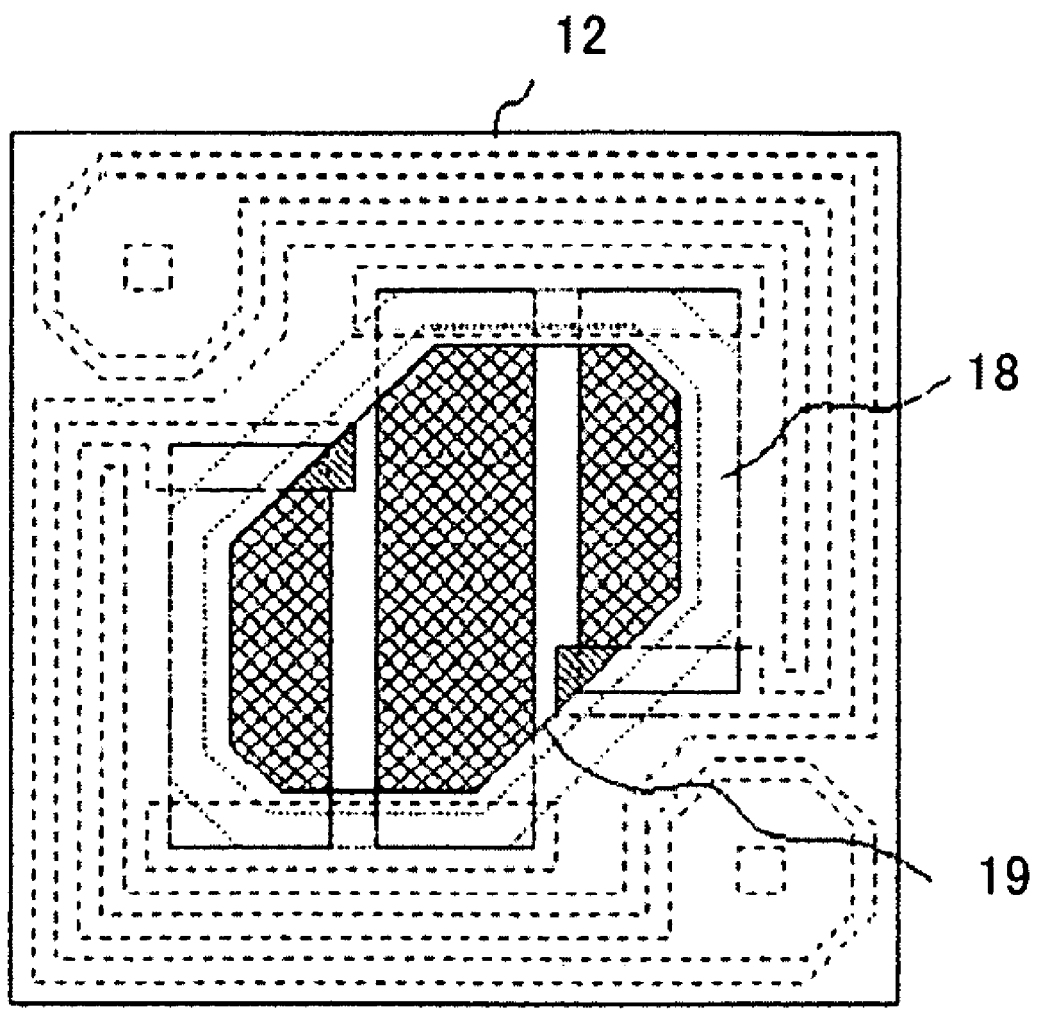
FIG. 6 is a unit pixel top plan view of the thermal-type infrared solid-state imaging device described in U.S. Pat. No. 7,276,698 B2.

In the above described embodiment, though only one layer member for eaves formation was formed in FIG. 1A, if the arbitrary number of film layers is formed here, the thermal-type infrared solid-state imaging device in which the eaves section is made to carry a special wavelength characteristic such as absorption and transmission of infrared rays can be realized. Here, when the eaves section is made into a multi-layer film lamination structure to make the eaves section to carry the special wavelength characteristic such as absorption and transmission of the infrared rays, the structure of the thermal-type infrared solid-state imaging device described in the U.S. Pat. No. 7,276,698 B2 shown in FIGS. 5 and 6 makes the entire eaves section into a thick film, so that the thermal response characteristic of the pixel is made extremely worse. However, in the present invention, the respective film thicknesses of the eaves connector and the region rising upward in mid air from the diaphragm 5 and the number of film layers can be cut down up to the mechanical strength of the minimum limit sufficient to support the eave section, and therefore, the thermal response characteristic of the pixel is prevented to be impaired. Further, since the film part is a place overlapped with the diaphragm, the infrared ray detection sensitivity of the pixel is also prevented to be reduced by the reduction of the film thickness and the reduction of the number of film layers.

By making the outermost film on the infrared ray incident side into a conductive material, and further, by performing impedance matching (sheet resistance condition 377 ohm/square) with a space, a reflection loss of the incident infrared rays can be also reduced.

Further, though only one layer member for eaves formation was formed in FIG. 1D also, this layer is also made into a multi-layer, and its mechanical strength can be increased by synergetic effect of those various kinds of materials, so that the entire film thickness can be also further reduced.

Figure 3A:
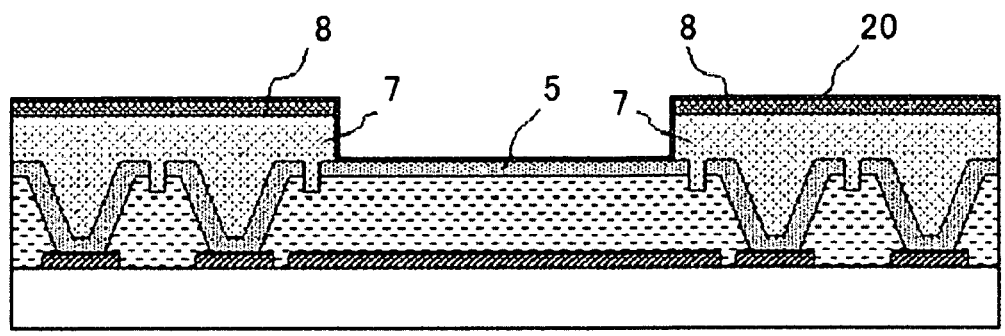
FIG. 3A is a schematic longitudinal sectional structural drawing for describing a structure and a manufacturing method of a thermal-type infrared solid-state imaging device according to another embodiment of the present invention.
Figure 3B:
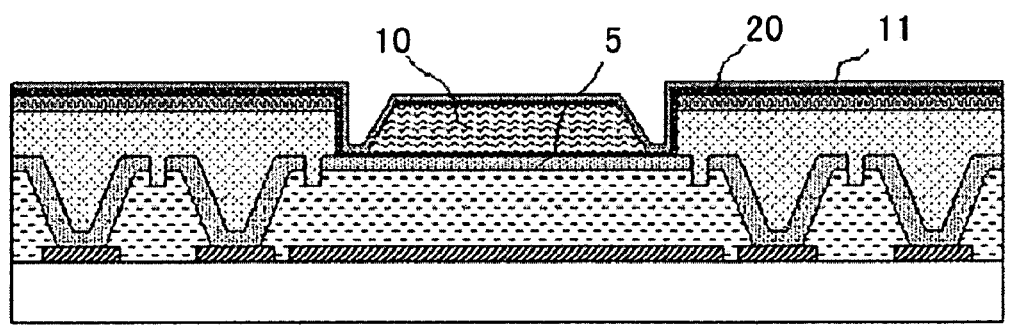
FIG. 3B is a schematic longitudinal sectional structural drawing for describing a structure and a manufacturing method of a thermal-type infrared solid-state imaging device according to another embodiment of the present invention.
Figure 3C:
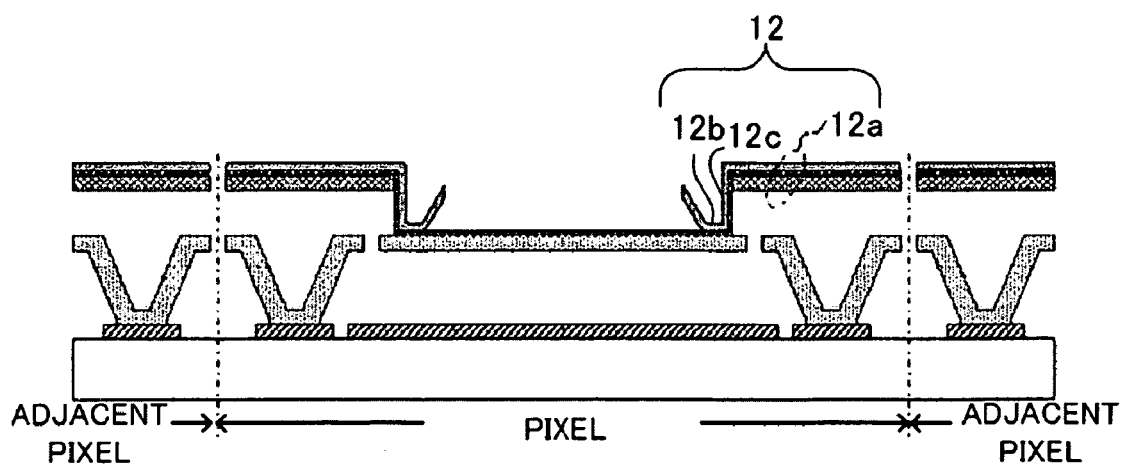
FIG. 3C is a schematic longitudinal sectional structural drawing for describing a structure and a manufacturing method of a thermal-type infrared solid-state imaging device according to another embodiment of the present invention.
Figure 4:
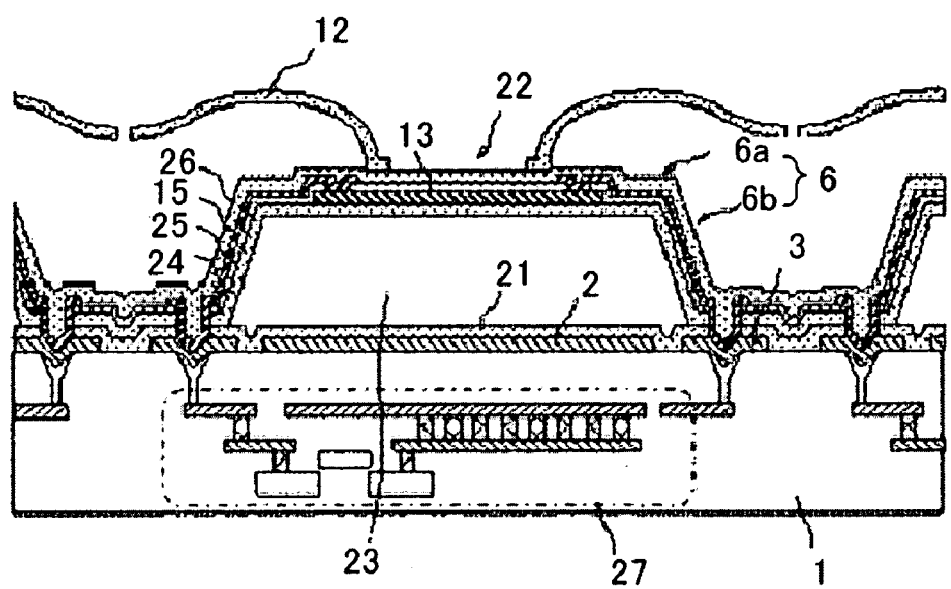
FIG. 4 is a sectional structural drawing along the current path showing the unit pixel of the thermal-type infrared solid-state imaging device described in Unexamined Japanese Patent Application KOKAI Publication No. 2001-215151.

In addition, the first sacrifice layer 4, the second sacrifice layer 7, and the third sacrifice layer 10 can be constituted of poly silicon or aluminum. When the second sacrifice layer 7 and the third sacrifice layer 10 are made of the same kind of material, if dry etching having strong anisotropy is used for patterning of the third sacrifice layer 10 in FIG. 1C, there is no problem. If not, however, there is a risk of the sidewall shape of the second sacrifice layer 7 being collapsed. Hence, as shown in FIGS. 3A to 3C, an extremely thin sacrifice layer protection film 20 is formed before the formation of the third sacrifice layer 10. The removal of the sacrifice layer when poly silicon is used for the sacrifice layer is, for example, performed by wet etching using hydrazine and tetramethylammoniumhydrooxide (TMAH), and by dry etching using $X_cF_2$ plasma and the like. The removal of the sacrifice layer when aluminum is used for the sacrifice layer is, for example, performed by wet etching using hydrochloric acid or hot phosphoric acid. When the Si nitride film is used for the insulating protection film constituting the diaphragm 5 and the support section 6, if hot phosphoric acid is made too hot (to 160° C.), the Si nitride film is also etched. Hence, care is required.

Further, when the Si oxide film is used for the material constituting the diaphragm 5, the support section 6, and the eaves section 12, the first sacrifice layer 4, the second sacrifice layer 7, and the third sacrifice layer 10 may be constituted by the Si nitride film, and vice versa. The removal of the sacrifice layer when the Si nitride film is the sacrifice layer is, for example, performed by wet etching using hot phosphoric acid, and the removal of the sacrifice layer when the Si oxide film is the sacrifice layer is, for example, performed by wet etching using hydrofluoric acid.

In the above described embodiment, though a description has been made on a bolometer-type infrared solid-state imaging device provided with a bolometer thin film as a temperature detecting section, but the present invention is not limited to this, and the effects can be exerted in all the thermal-type infrared solid-state imaging devices capable of enhancing the sensitivity by an eaves structure such as being provided with a thermopile as the temperature detecting section.

EXAMPLE

A bolometer-type infrared solid-state imaging device whose number of effective pixels is 320×240 and pixel pitch is 23.5 μm was fabricated. On a Si integrated circuit substrate, a pixel having the structure shown in FIGS. 2A and 2B was formed in the shape of an array. A ratio of the pixel light receiving area to the entire pixel area was approximately 60% in the case of FIG. 2A where an eaves structure was not provided, and approximately 92% in the case of FIG. 2B where the eaves structure was provided. A lower layer insulating protection film and an upper layer insulating protection film constituting a diaphragm and a support section were both formed by a Si nitride film of 150 nm in thickness. As the bolometer thin film, vanadium oxide of 100 nm in thickness was used. For the insulating protection film on the bolometer thin film, a Si nitride film of 50 nm in thickness was used. For a wiring, in order not to let the heat generated by infrared rays to escape as much as possible, titanium/aluminum/vanadium of 50 nm in thickness having a low thermal conductivity was employed. An eaves section was formed using a Si nitride film of 250 nm in thickness for a first layer member for eaves formation, and using a Si nitride film of 50 nm in thickness for a second layer member for eaves formation. A margin from a diaphragm edge to the eaves connector was made 0.3 μm, a contact part width was made 0.4 μm, and a margin from the eaves connector to an eaves opening was made 0.4 μm. As a result, a ratio of the eaves opening area to the pixel light receiving area was approximately 49%.

The bolometer-type infrared solid-state imaging device of the same standard having a pixel having the structure described in the U.S. Pat. No. 7,276,698 B2 shown in FIG. 6 was also fabricated at the same time, and a performance comparison was made with the previous one. The eaves section was formed by a Si nitride film of 300 nm in thickness. The margin from the diaphragm edge to the eaves connector became 1 μm, the contact point width became 1 μm, and the margin from the eaves connector to the eave opening became 0.75 μm. As a result, a ratio of the eaves opening area to the pixel light receiving area became approximately 27%. This shows that a removal ratio of the unnecessary part for eaves formation member was improved approximately by 1.8 times in the present invention.

With respect to the light receiving part of the eaves section, since the material and the film thickness of both devices are the same, a sensitivity comparison indicated the same performance. However, since the volume of the pixel in the present invention was reduced to approximately 75% of the structure of the pixel shown in FIG. 6, a thermal time constant of the present invention was approximately 12 msec against approximately 16 msec in thermal constant of the pixel having the structure shown in FIG. 6.

From the above, the effectiveness of the thermal-type infrared solid-state imaging device and its manufacturing method of the present invention were confirmed.

As described above, in the thermal-type infrared solid-state imaging device according to the present invention, the structure of the eaves section is such that the thickness of the region covering the surfaces opposite to the substrates of the components other than the diaphragm across a space with the components other than the diaphragm is at least thicker than the thickness of the eaves side connector contacting the connection area of the diaphragm and the thickness of the region rising upward in mid air from the diaphragm, or the number of film layers constituting the former is greater than the number of film layers constituting the latter. Consequently, there is such effect obtained that, by increasing the thickness and the number of layers of the former or devising a combination of the thickness and the quality of the material of each layer inside the laminated films, the incident infrared ray absorbing ability is maintained or enhanced, while the thermal response characteristic of the pixel can be improved by the decrease of the thickness and the number of film layers of the latter.

Further, in the manufacturing method of the thermal-type infrared solid-state imaging device according to the present invention, in addition to the capability of manufacturing the present thermal-type infrared solid-state imaging device structure, the expansion of the gap due to the diffraction effect at the time of the pattern formation can be suppressed, and therefore, the margin from the diaphragm edge to the eaves connector and the margin from the eaves connector to the eaves opening can be taken without any further increase. This is because, since the sacrifice layer formation at the outer side than the connection area of the diaphragm and the sacrifice layer formation at the inner side than the connection area of the diaphragm are performed by a separate process, the connection area opening of the sacrifice layer which defines a geometry of the eaves connector is not subjected to the pattern formation of the extremely narrow gap by one time exposure to photosensitive polyimide and photo-resist. Thereby, there is such effect obtained that the overlapping part with the diaphragm in the eaves section can be cut down, and further, the thermal response characteristic of the pixel can be improved.

In addition, the following configurations are included as the suitable modifications of the present invention.

The thermal-type infrared solid-state imaging device according to a first aspect of the present invention is characterized as follows.

Preferably, the substrate has a connection electrode with the integrated circuit, and the diaphragm includes an infrared absorbing section heated by absorbing infrared rays, a temperature detecting section for detecting a temperature change of the infrared absorbing section by the change of the temperature by the heat from the infrared absorbing section, and an electrode section electrically connected to the temperature detecting section, wherein the wiring is included by the formation of at least a part of the support section by a conductive material, and the wiring connects the connection electrode and the electrode section, thereby electrically connecting the integrated circuit and the temperature detecting section of the diaphragm, and the first region of the eaves section covers the opposite sides to the substrates of the connection electrode and the support section across a space with the connection electrode and the support section.

Further preferably, the eaves section is characterized in that the number of film layers including the first region is greater than the number of film layers including the second region and the third region.

Preferably, the eaves section is characterized in that an outermost film on infrared ray incident side of the film including the first region and a film including the second region and the third region are formed into a same layer.

Preferably, the eaves section is characterized in that at least a part of the film including the second region and the third region includes the sacrifice protection film.

Preferably, the eaves section is characterized in that the outermost film on infrared ray incident side of the film including the first region is a conductive material.

Preferably, the eaves section is characterized in that the outermost film on infrared ray incident side of the film including the first region is impedance-matched with a space.

The manufacturing method of the thermal-type infrared solid-state imaging device according to a second aspect of the present invention is characterized as follows.

Preferably, the second process further includes exposing the first sacrifice layer while forming the diaphragm and the support section, and the seventh process further includes exposing the second sacrifice layer by removing a part of the second member for eaves formation and the first member for eaves formation disposed at the outer side than the vicinity of outer circumference of the diaphragm by patterning, and in the eighth process, the first sacrifice layer, the second sacrifice layer, and the third sacrifice layer are removed from an area in which the first member for eaves formation and the second member for eaves formation are removed.

Preferably, in the second process, the diaphragm including the infrared absorbing section heated by absorbing infrared rays, the temperature detecting section for detecting a temperature change of the infrared absorbing section by the change of the temperature by the heat from the infrared absorbing section, and the electrode section electrically connected to the temperature detecting section is formed, and at the same time, the support section at least one part of which is formed by a conductive material so as to constitute a wiring electrically connecting the connection electrode of the substrate and the electrode section of the diaphragm, and supporting the diaphragm above a surface of one side of the substrate with space in between is formed on the connection electrode of the outside of the diaphragm and on the first sacrifice layer, and in the fourth process, the first member for eaves formation and the second sacrifice layer in the connection area of the eaves section provided in the vicinity of outer circumference on the diaphragm and in the inner side area from the connection area are removed by patterning, and in the fifth process, a third sacrifice layer is disposed on the area, except the connection area provided in the vicinity of outer circumference on the diaphragm, in which the first member for eaves formation and the second sacrifice layer on the diaphragm are removed, and in the sixth process, a second member for eaves formation is disposed on the first member for eaves formation, the connection area, and the third sacrifice layer.

Further preferably, a process of disposing a sacrifice layer protection film on the diaphragm, on the first member for eaves formation, and on a second sacrifice layer side wall formed by patterning removal is added after the fourth process.

Preferably, a conductive material is used as a material of the second member for eaves formation.

Preferably, polyimide is used as the material of the first sacrifice layer, the second sacrifice layer, and the third sacrifice layer.

INDUSTRIAL APPLICABILITY

As an application example of the present invention, the manufacture of the thermal-type infrared solid-state imaging device used for a night-vision system (infrared camera) and a thermography can be cited.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. A thermal-type infrared solid-state imaging device, comprising:
    a substrate in which an integrated circuit for reading out a signal is formed;
    an infrared detector having at least a diaphragm including a temperature detecting section and a support section supporting the diaphragm above a surface of one side of the substrate with space in between and including a wiring electrically connecting the integrated circuit and the temperature detecting section of the diaphragm; and
    an eaves section connected to the vicinity of outer circumference of the diaphragm and having at least a first region extending to the outside of the diaphragm, a second region connected to the vicinity of outer circumference of the diaphragm, and a third region rising upward in mid air from the vicinity of outer circumference, and transmitting the heat generated by absorbing incident infrared rays to the diaphragm, wherein
    the eaves section has the thickness of the first region thicker than the thickness of the second region and third region.

2. The thermal-type infrared solid-state imaging device according to claim 1, wherein the substrate includes a connection electrode with the integrated circuit, wherein
    the diaphragm includes an infrared absorbing section heated by absorbing infrared rays, a temperature detecting section for detecting a temperature change of the infrared absorbing section by the change of the temperature by heat from the infrared absorbing section, and an electrode section electrically connected to the temperature detecting section,
    the wiring is included by the formation of at least a part of the support section by a conductive material, and the wiring electrically connects the integrated circuit and the temperature detecting section of the diaphragm by connecting the connection electrode and the electrode section, and
    wherein the first region of the eaves section covers the opposite sides to the substrates of the connection electrode and the support section across a space with the connection electrode and the support section.

3. The thermal-type infrared solid-state imaging device according to claim 1, wherein the eaves section has the number of film layers including the first region greater than the number of film layers including the second region and the third region.

4. The thermal-type infrared solid-state imaging device according to claim 3, wherein an outermost film on infrared ray incident side of the film including the first region and a film including the second region and the third region are formed into a same layer.

5. The thermal-type infrared solid-state imaging device according to claim 3, wherein the eaves section includes a sacrifice layer protection film at least in a part of the film including the second region and the third region.

6. The thermal-type infrared solid-state imaging device according to claim 3, wherein the eaves section has the outermost film on infrared ray incident side of the film which is made of a conductive material and includes the first region.

7. The thermal-type infrared solid-state imaging device according to claim 6, wherein the eaves section has the outermost film on infrared ray incident side of the film which is impedance-matched with a space and includes the first region.

8. A manufacturing method of a thermal-type infrared solid-state imaging device, comprising at least:
    a first process of disposing a first sacrifice layer on a substrate formed with an integrated circuit for reading out a signal and provided with a connection electrode with the integrated circuit except on the connection electrode;
    a second process of forming a diaphragm including a temperature detecting section on the first sacrifice layer, and a support section including a wiring electrically connecting the connection electrode of the substrate and the temperature detecting section of the diaphragm, wherein the diaphragm is supported above a surface of one side of the substrate with space in between by the support section;
    a third process of disposing a second sacrifice layer on entire surface of the substrate, and in addition, disposing a first member for eaves formation on the second sacrifice layer;
    a fourth process of removing by patterning the first member for eaves formation and the second sacrifice layer on the diaphragm;
    a fifth process of disposing a third sacrifice layer on the diaphragm except the vicinity of outer circumference;
    a sixth process of disposing a second member for eaves formation on entire surface of the substrate;
    a seventh process of removing by patterning a second member for eaves formation disposed at the inner side than the vicinity of outer circumference of the diaphragm; and
    an eighth process of removing the first sacrifice layer, the second sacrifice layer, and the third sacrifice layer.

9. The manufacturing method of the thermal-type infrared solid-state imaging device according to claim 8, wherein,
    the second process further includes exposing the first sacrifice layer while forming the diaphragm and the support section;
    the seventh process further includes exposing the second sacrifice layer by removing a part of the second member for eaves formation and the first member for eaves formation disposed at the outer side than the vicinity of outer circumference of the diaphragm by patterning; and
    in the eighth process, the first sacrifice layer, the second sacrifice layer, and the third sacrifice layer are removed from an area in which the first member for eaves formation and the second member for eaves formation are removed.

10. The manufacturing method of the thermal-type infrared solid-state imaging device according to claim 8, wherein,
    in the second process, the diaphragm including the infrared absorbing section heated by absorbing infrared rays, the temperature detecting section for detecting a temperature change of the infrared absorbing section by the change of the temperature by the heat from the infrared absorbing section, and the electrode section electrically connected to the temperature detecting section is formed, and at the same time, the support section at least one part of which is formed by a conductive material so as to include a wiring electrically connecting the connection electrode of the substrate and the electrode section of the diaphragm, and supporting the diaphragm above a surface of one side of the substrate with space in between is formed on the connection electrode of the outside of the diaphragm and on the first sacrifice layer;

in the fourth process, the first member for eaves formation and the second sacrifice layer in the connection area of the eaves section provided in the vicinity of outer circumference on the diaphragm and in the inner side area from the connection area are removed by patterning;

in the fifth process, a third sacrifice layer is disposed on the area, except the connection area provided in the vicinity of outer circumference on the diaphragm, in which the first member for eaves formation and the second sacrifice layer on the diaphragm are removed; and in the sixth process, a second member for eaves formation is disposed on the first member for eaves formation, the connection area, and the third sacrifice layer.

11. The manufacturing method of the thermal-type infrared solid-state imaging device according to claim 8, wherein a process of disposing a sacrifice layer protection film on the diaphragm, the first member for eaves formation and a side wall of the second sacrifice layer formed by patterning removal is added after the forth process.

12. The manufacturing method of the thermal-type infrared solid-state imaging device according to claim 8, wherein a conductive material is used as a material of the second member for eaves formation.

13. The manufacturing method of the thermal-type infrared solid-state imaging device according to claims 8, wherein polyimide is used as a material of the first sacrifice layer, the second sacrifice layer, and the third sacrifice layer.

* * * * *